May 10, 1927.
W. HOOS
1,628,244
SPOOLLESS TWINE BALL, CROSS WOUND BOBBIN, OR THE LIKE
Filed June 29, 1926
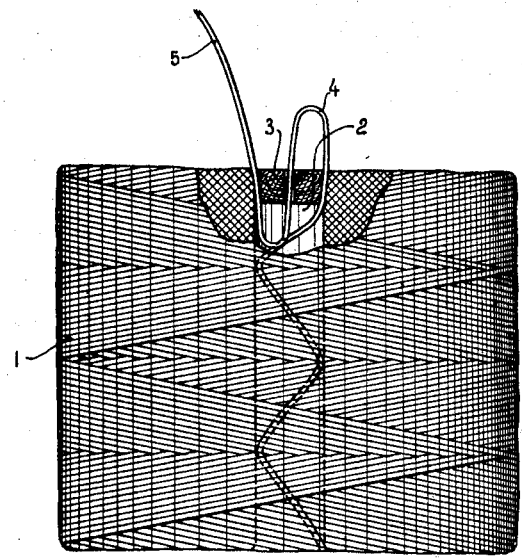
FIG.I.
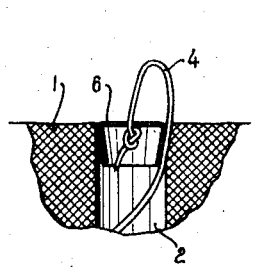 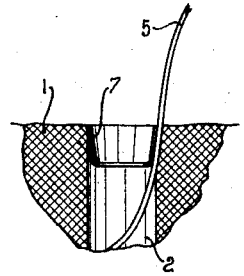
FIG.2.      FIG.3.
Inventor
Willem Hoos.
per
Attorney.

Patented May 10, 1927.

1,628,244

UNITED STATES PATENT OFFICE.

WILLEM HOOS, OF WASSENAAR, NETHERLANDS, ASSIGNOR TO NAAMLOOZE VENNOOT-SCHAP VEREENIGDE TOUWFABRIEKEN, OF ROTTERDAM, NETHERLANDS.

SPOOLLESS TWINE BALL, CROSS-WOUND BOBBIN, OR THE LIKE.

Application filed June 29, 1926, Serial No. 119,375, and in Germany March 22, 1926.

Bindertwine balls and cross-wound bobbins which, after being wound, are taken off the winding spool so as to come into the market in a spoolless, i. e. coreless condition and which are extensively used, amongst others in harvesting machines, are wound off from the inside and not from the outside.

In such bindertwine balls, one end of the twine of string is knotted to the body portion at the circumference of the ball, whereas the other end lies more or less freely in, and usually projects from, the central hole of the ball. This has the disadvantage, that during transport the free end of the bindertwine may withdraw into the central hole and that, if said hole is more or less closed by the pressure exerted on the ball by other cargo, said free end is difficult to find. Should said end happen to be drawn out on the wrong side of the ball, the twine is likely to twist during the unwinding. On the other hand, if the free end projects too far from the central hole, it may get entangled and unwind during the transport.

This invention has for its object to avoid the above inconveniences. With this object in view, it is suggested to lock the free end of the twine by means of a stopper inserted into the central hole on the side, where the twine can be drawn out without twisting. If the stopper is solid, it may be provided with a hole through which the free end of the twine is passed in such a manner, that a pull on the said end causes the stopper to be removed. Alternatively, the stopper may be annular, or have the form of a thimble, so that it can be removed by a finger put into it. In this case it is not necessary for the free end of the bindertwine to be passed through a hole in the stopper, but said end may then be clamped between the stopper and the wall of the central hole, or it may remain entirely within said hole, together with the label that is ordinarily fastened thereto. Irrespective of whether the stopper is solid or hollow, it may have substantially the same length as the central hole in the ball, although this relatively great length increases the cost, whereas the insertion of a long stopper may cause the inner layer of twine to be stripped.

The annexed drawing illustrates, by way of example only, three embodiments of the invention. Fig. 1 shows a complete twine ball, partly in elevation, partly in section, Figs. 2 and 3 being part sectional elevations of twine balls with other forms of stoppers.

The twine ball 1, Fig. 1, has a central hole 2, into which is inserted a slightly tapered wooden stopper 3, after the free end portion of the twine has been passed through a central bore hole of the stopper so as to form a loop 4, the end 5 of the twine freely projecting through a sufficient distance. As will be understood, a pull exterted on the free end 5, or on the loop 4, causes the stopper 3 to be lifted from its seat.

According to Fig. 2, the stopper 6 is of sheet metal, the end portion of the twine being passed through a central hole in said stopper and provided with a knot on the inside of the stopper, which may therefore be removed by a pull on the loop 4.

Fig. 3 shows an annular metal stopper 7, which can be removed by a finger put into it. In this case, the free end portion of the twine need not be passed through a bore hole in the stopper, but may simply be clamped between the stopper and the inner wall of the central hole.

Claims.

1. In a coreless twine ball, cross-wound bobbin or the like having a central hole from one end of which projects the free end of the twine, a stopper inserted in said end of the central hole to lock the said free end of the twine.

2. A coreless twine ball, cross-wound bobbin or the like as recited in claim 1 having a loop formed outside the stopper by the projecting free end of the twine, the free end of the twine then passing through a hole in the stopper back into the central hole.

3. A coreless twine ball, cross-wound bobbin or the like as recited in claim 1 having a loop formed outside the stopper by the projecting free end of the twine, the free end of the twine then passing through a hole in the stopper back into the central hole, and means for preventing the withdrawal of the free end of the twine from the hole in the stopper.

4. In a coreless twine ball, cross-wound bobbin or the like having a central end-to-end opening, a removable plug inserted in one end of the said opening to prevent deformation of the end of the opening and thus facilitate withdrawal of the end of the twine upon removal of the said plug.

In testimony whereof I affix my signature.
WILLEM HOOS.